(12) United States Patent
Lakerdas et al.

(10) Patent No.: US 11,345,418 B2
(45) Date of Patent: May 31, 2022

(54) DRIVE ARRANGEMENT FOR ADJUSTING A FLAP OF A MOTOR VEHICLE

(71) Applicant: Brose Fahrzeugteile GmbH & Co. Kommanditgesellschaft, Bamberg, Bamberg (DE)

(72) Inventors: Andrew Lakerdas, London (CA); Kim Taylor, Farmington Hills, MI (US); Vitali Wendland, Bamberg (DE); Maximilian Kunzelmann, Bamberg (DE); Jacob Rye, Davison, MI (US); Adam Laczo, Bamberg (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 203 days.

(21) Appl. No.: 16/690,220

(22) Filed: Nov. 21, 2019

(65) Prior Publication Data

US 2021/0155297 A1 May 27, 2021

(51) Int. Cl.
| | |
|---|---|
| *B62D 33/027* | (2006.01) |
| *B62D 33/03* | (2006.01) |
| *B60P 1/26* | (2006.01) |
| *E05F 1/10* | (2006.01) |
| *E05F 1/12* | (2006.01) |
| *E05F 15/614* | (2015.01) |
| *B62D 33/037* | (2006.01) |
| *E05B 83/08* | (2014.01) |
| *E05B 81/34* | (2014.01) |
| *B60R 5/04* | (2006.01) |

(52) U.S. Cl.
CPC .............. *B62D 33/037* (2013.01); *B60P 1/26* (2013.01); *B62D 33/0273* (2013.01); *E05B 81/34* (2013.01); *E05B 83/08* (2013.01); *E05F 1/1008* (2013.01); *E05F 1/1207* (2013.01); *E05F 15/614* (2015.01); *B60R 5/04* (2013.01)

(58) Field of Classification Search
CPC ........ B62D 33/0273; B62D 33/03; B60J 5/10; B60J 5/101; E05F 1/1207; E05F 1/1008; E05F 15/614; B60P 1/26; B60P 1/267; E05B 81/34; E05B 83/08
USPC .................................. 296/57.1, 146.4, 146.8
See application file for complete search history.

(56) References Cited

U.S. PATENT DOCUMENTS 5,988,724 A * 11/1999 Wolda ................. B62D 33/0273
16/308
6,637,796 B1 * 10/2003 Westerdale ........ B62D 33/0273
296/56

(Continued)

*Primary Examiner* — Gregory A Blankenship
(74) *Attorney, Agent, or Firm* — Brooks Kushman P.C.

(57) ABSTRACT

A drive arrangement for adjusting a flap, in particular a tailgate, of a motor vehicle, which in the mounted state is mounted on a body of the motor vehicle so as to be pivotable about a flap pivot axis and which can be adjusted between an open position and a closed position over a pivot angle. It is proposed that the drive arrangement comprises a torsion spring arrangement having a torsion spring, the torsion spring being adapted to generate a torsional torque about a torsion axis, that the torsion axis is arranged with an offset to the flap pivot axis, and that the drive arrangement comprises a first gear unit which converts the torsional torque into a supporting force or torque acting on the flap in the direction of the closed position or in the direction of the open position thereof.

19 Claims, 4 Drawing Sheets

(56) References Cited

U.S. PATENT DOCUMENTS

| | | | | |
|---|---|---|---|---|
| 6,811,208 | B1* | 11/2004 | Kettinger | E05D 15/5214 296/146.12 |
| 7,540,554 | B2* | 6/2009 | Bals | E05F 15/614 296/146.11 |
| 9,540,859 | B2* | 1/2017 | Hansen | E05F 15/614 |
| 9,822,574 | B2* | 11/2017 | Heiberger | E05F 15/614 |
| 2007/0152471 | A1* | 7/2007 | Zagoroff | B62D 33/03 296/146.4 |
| 2008/0197651 | A1* | 8/2008 | Stratten | B62D 33/0273 296/50 |
| 2008/0277960 | A1* | 11/2008 | Zagoroff | B62D 33/03 296/57.1 |
| 2009/0189406 | A1* | 7/2009 | Gleason | B62D 33/0273 296/57.1 |
| 2009/0302630 | A1* | 12/2009 | Duffy | E05F 1/123 296/57.1 |
| 2011/0057469 | A1* | 3/2011 | Zielinsky | E05F 1/1215 296/57.1 |
| 2013/0038081 | A1* | 2/2013 | Kerr, III | B60J 5/108 296/57.1 |
| 2015/0114176 | A1* | 4/2015 | Bisang | E05F 15/00 74/665 A |
| 2017/0009508 | A1* | 1/2017 | Hunt | E05F 15/627 |
| 2017/0089112 | A1* | 3/2017 | Rosales | B62D 33/037 |
| 2018/0291664 | A1* | 10/2018 | Felix Frias | E05F 1/1215 |
| 2019/0368255 | A1* | 12/2019 | Schatz | E05F 1/1238 |
| 2020/0087962 | A1* | 3/2020 | Trentin | E05D 11/1057 |
| 2020/0131827 | A1* | 4/2020 | Townson | B62D 33/03 |
| 2020/0148283 | A1* | 5/2020 | Robinson | B62D 33/03 |
| 2020/0190887 | A1* | 6/2020 | Gerken | E05F 15/614 |
| 2020/0398907 | A1* | 12/2020 | Rosales | E05B 83/18 |
| 2021/0155297 | A1* | 5/2021 | Lakerdas | B62D 33/0273 |
| 2021/0198933 | A1* | 7/2021 | Wittelsbuerger | E05F 15/622 |

* cited by examiner

DRIVE ARRANGEMENT FOR ADJUSTING A FLAP OF A MOTOR VEHICLE

TECHNICAL FIELD

The present disclosure relates to a drive arrangement for adjusting a flap of a motor vehicle.

BACKGROUND

A flap of a motor vehicle may be a tailgate, a lift gate, a trunk lid, a back door, a front hood, a side door or the like. All those flaps are pivotable about a flap pivot axis and can be adjusted between an open position and a closed position over a pivot angle.

SUMMARY

One or more objects of the present disclosure may be to provide a drive arrangement for adjusting a flap of a motor vehicle which is powerful enough to move heavier flaps and takes as little space as possible in the flap.

The drive arrangement of the present disclosure may use a torsion spring for generating a torsional torque about a torsion axis. The torsional torque may be used to support the flap when the flap moves towards the closed position of the flap or, alternatively, when the flap moves towards the open position. It should be noted that the torsion spring may be the only device provided to act on the flap. In this case, the torsion spring supports in particular the manual operation of the flap. When the user for example adjusts a tailgate as flap from the open position to the closed position, the torsion spring supports the movement, so that the user does not have to lift the entire weight of the flap. In addition, as will be described later on, the drive arrangement may also be fitted with a drive unit comprising a rotary motor unit for motorized adjustment of the flap.

In one or more embodiments, the torsion spring may be arranged such that the torsion axis is offset from the flap pivot axis. An offset between the two geometric axes has the advantage that the torsion spring can be arranged at any location that is particularly favorable in terms of space. The torsion axis does no longer necessarily coincide with the flap pivot axis.

In order to support a pivoting movement of the flap about the flap pivot axis despite the offset of the torsion axis to the flap pivot axis, a first gear unit is provided which enables a force or torque transmission.

In detail, it is proposed that the drive arrangement comprises a torsion spring arrangement having a torsion spring, the torsion spring being adapted to generate a torsional torque about a torsion axis, that the torsion axis is arranged with an offset to the flap pivot axis, and that the drive arrangement comprises a first gear unit which converts the torsional torque into a supporting force or torque acting on the flap in the direction of the closed position or in the direction of the open position thereof.

As one example, the torsion spring may be a helical torsion spring. As another example, the torsion spring may be a torsion bar.

Claims 3 and 4 define the preferred operating principles of the torsion spring.

In claims 5 to 9 the preferred amount of supporting force or supporting torque relative to the flap position, i.e. relative to the pivot angle of the flap, is particularly specified.

According to the preferred embodiment of claim 8 in a section of the pivoting angle of the flap extending between the closed position and an intermediate position, the torsion spring is free of load. In an alternative embodiment it is conceivable that in a section of the pivoting angle of the flap extending between the open position and an intermediate position, the torsion spring is free of load. It is also conceivable that in this section of the pivoting angle the torsion spring is preloaded (biased), but not engaged with the vehicle body, in particular not engaged with a corresponding body-side torque transmission point (claim 9).

According to the preferred embodiments in claims 10 to 12 a preferred non-linear course of the supporting force or torque over the pivot angle of the flap is specified.

Claim 13 is directed to a drive arrangement comprising a drive unit with a rotary motor unit, the motor unit having an output shaft rotating about an axis of rotation which is also arranged with an offset to the flap pivot axis. A second gear unit converts the rotational movement of the output shaft of the motor unit into a pivotal movement of the flap about the flap pivot axis.

In claim 14 preferred arrangements of the torsion axis, the rotation axis and the flap pivot axis relative to each other are specified. In particular the torsion spring radially surrounds the motor unit (claim 15).

An independent teaching according to claim 16 is directed to a flap arrangement with a flap, in particular a tailgate, of a motor vehicle, the flap arrangement comprising at least one drive arrangement according to the present invention. All explanations given with respect to the first teaching are fully applicable to this second teaching.

In the preferred embodiment of claim 17 the torsion spring arrangement and/or the motor unit is mounted on the flap and/or in the flap.

According to the further preferred embodiment of claim 18, a drive arrangement according to the present invention is arranged on each side of the flap. One or both drive arrangements may comprise a drive unit with a rotary motor unit as described before.

BRIEF DESCRIPTION OF THE DRAWINGS

In the following, embodiments of the invention are explained with respect to the drawings. In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The drive arrangement (US 2017/0089112 A1), which is the starting point of the invention, is mounted in the flap, in particular in the flap body. The flap or flap body is mounted on a body of the motor vehicle so as to be pivotable about a flap pivot axis. When actuating the drive arrangement the flap can be adjusted between an open position and a closed position. The drive arrangement comprises a motor unit as part of a drive unit, which drive unit is a linear drive unit, in particular a spindle drive unit. By means of a gear unit with different levers a linear movement generated by the drive unit is converted into a pivoting movement of the flap.

The drive arrangement is particularly advantageous for slim flaps as it takes up very little space. However, since flaps are becoming increasingly heavy these days due to the many aids that are built into them, such as closing or opening auxiliary drives, electronic vehicle locks, other flaps integrated into the flap or the like, a drive arrangement as described above is often not sufficient to move the flap.

For this reason it is also known to install a torsion bar in the flap coaxially to the flap pivot axis. The ends of the torsion bar are fixed to the body of the vehicle and the middle section of the torsion bar is fixed to the flap. In the closed position of the flap the torsion bar is free of load, whereas the torsion bar is twisted and thereby mechanically loaded when adjusting the flap from the closed position to the open position (opening direction). When the flap is moved in the open position the torsion bar generates a torsional torque about a torsion axis, which torsional torque acts in a supporting manner on the flap in the direction of the closed position (closing direction). However, such a torsion bar takes up a lot of space inside of the flap.

Figure 1:
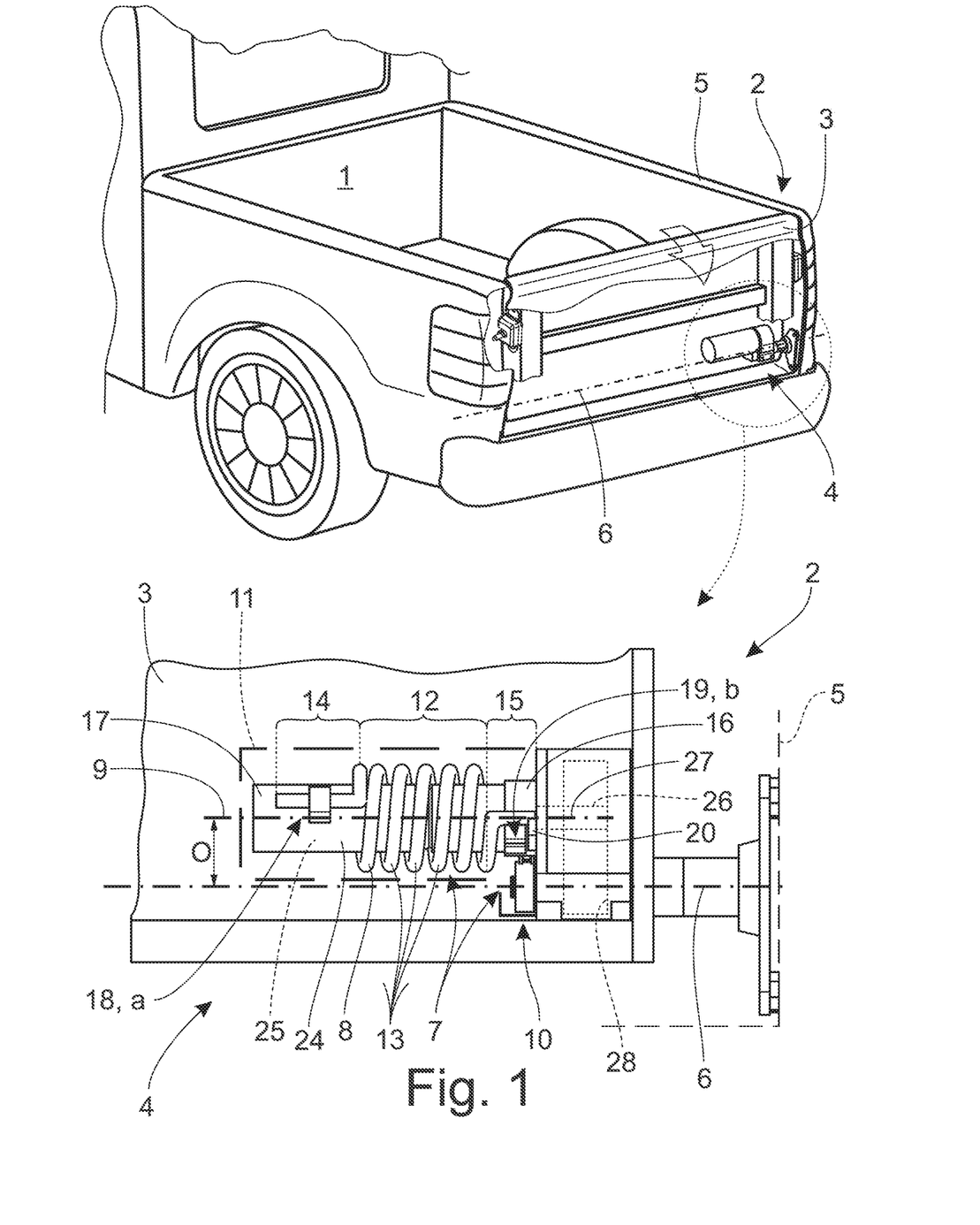
FIG. 1 shows a motor vehicle with a proposed flap arrangement comprising a proposed drive arrangement.

The motor vehicle 1 shown in FIG. 1 comprises a flap arrangement 2 with a flap 3 and with at least one, here and preferably exactly one, drive arrangement 4 for adjusting the flap 3. In the shown mounted state the flap 3 is mounted on a body 4 of the motor vehicle 1 so as to be pivotable about a flap pivot axis 6. The flap 3 can be adjusted between an open position shown in FIG. 3c) and a closed position shown in FIGS. 1 and 3a) over a pivot angle α.

Presently, the expression "flap" is to be understood in a broad sense. It includes in particular any kind of pivotable doors of a motor vehicle 1 such as tailgates, lift gates, trunk lids, back doors, front hoods, side doors or the like. Here the flap 3 is designed as a pickup truck tailgate, which is to be understood as an embodiment.

It is essential for the invention, that the drive arrangement 4 comprises a torsion spring arrangement 7 having a torsion spring 8, the torsion spring 8 being adapted to generate a torsional torque about a torsion axis 9, that the torsion axis 9 is arranged with an offset O to the flap pivot axis 6, and that the drive arrangement 4 comprises a first gear unit 10 which converts the torsional torque into a supporting force or torque acting on the flap 3 in the direction of the closed position or in the direction of the open position thereof.

Here and preferably the torsion spring 8 is a helical torsion spring. As can be seen in the enlarged view in FIGS. 1, 2a) and 2b), which view does not show the optional drive arrangement housing 11, the torsion spring 8 comprises a section 12 having windings 13 and, on each axial side of the section 12 a further section 14, 15 for the introduction of a circumferential load to generate the torsional torque. The further sections 14, 15 are each formed by a section of the spring wire in which the spring wire extends parallel to the torsion axis 9. In another embodiment not shown here the torsion spring 8 may also be formed as a torsion bar.

In all exemplary embodiments shown in FIGS. 1 to 4 the torsion spring 8, when generating a torsional torque causing the corresponding supporting force or torque, is biased about the torsion axis 9 between a flap-side torque transmission point a and a body-side torque transmission point b.

The term "biased about the torsion axis" means that the torsion spring 8 is biased circumferentially around the torsion axis 9.

A flap-side torque transmission point a and a body-side torque transmission point b is each a point on a component 16, 17 mechanically connected directly or indirectly to the flap or body, respectively. Here the flap-side torque transmission point a is a point on a housing 17 which is mechanically connected indirectly via the housing 11 to the flap 3. The elements 11 and 17 form a force effect chain between the flap 3 and the flap-side torque transmission point a. Accordingly the flap-side torque transmission point a is assigned to the flap 3; in particular, it thereby follows the movement of the flap 3. Moreover, the body-side torque transmission point b here is a point on a ring shaped or sleeve shaped component 16 providing a lever, the component 16 or lever being mechanically connected to the body 5 of the vehicle 1 indirectly via further elements 22, 23. The elements 16, 22, 23 form a force effect chain between the body 5 and the body-side torque transmission point b. Accordingly the body-side torque transmission point b is assigned to the body 5 of the vehicle 1.

Preferably, if the two torque transmission points a, b are displaced relative to one another about the torsion axis 9 in one direction, at least over a minimum angle range, the torsional torque generated by the torsion spring 8 increases, and, if the two torque transmission points a, b are displaced relative to one another in the opposite direction about the torsion axis 9, the torsional torque generated by the torsion spring 8 drops, if appropriate until no more torsional torque is present.

The term "at least over a minimum angle range" means that an angle range can also be provided in which the torsional torque generated by the torsion spring 8 does not change or in which there is no torsional torque at all, which will be explained further below. In this case, in particular, no supporting force or torque is generated, even if a torsional torque is generated by the torsion spring 8.

Furthermore, as can best be seen in FIG. 2a), the flap-side torque transmission point a is preferably formed by a flap-side stop 18 and/or the body-side torque transmission point b is preferably formed by a body-side stop 19. At each of the stops 18, 19, when the torsion spring 8 generates a torsional torque which causes the supporting force or torque, an associated spring section 14, 15 of the torsion spring 8 bears tangentially, that is in a circumferential direction.

The spring section 14 and/or the spring section 15 of the torsion spring 8 may be a spring end section, for helical torsion springs especially formed by an axial spring leg.

However, one and/or the other spring section 14, 15 of the torsion spring 8 can also be firmly connected to the assigned torque transmission point a, b, in particular by means of a material-locking or form-fitting connection, e.g. via a welded or plug-in connection.

Here and preferably the supporting force or torque is greater in the open position of the flap 3 than in the closed position of the flap 3. However, in another embodiment not shown here, the supporting force or torque may also be greater in the closed position of the flap 3 than in the open position of the flap 3, e.g. when the flap 3 is a lift gate.

In particular, here also the torsional torque generated by the torsion spring 8 is greater in the open position than in the closed position of the flap 3. However, in another embodiment not shown here, the torsional torque generated by the torsion spring 8 may also be greater in the closed position than in the open position of the flap 3.

Figure 3:
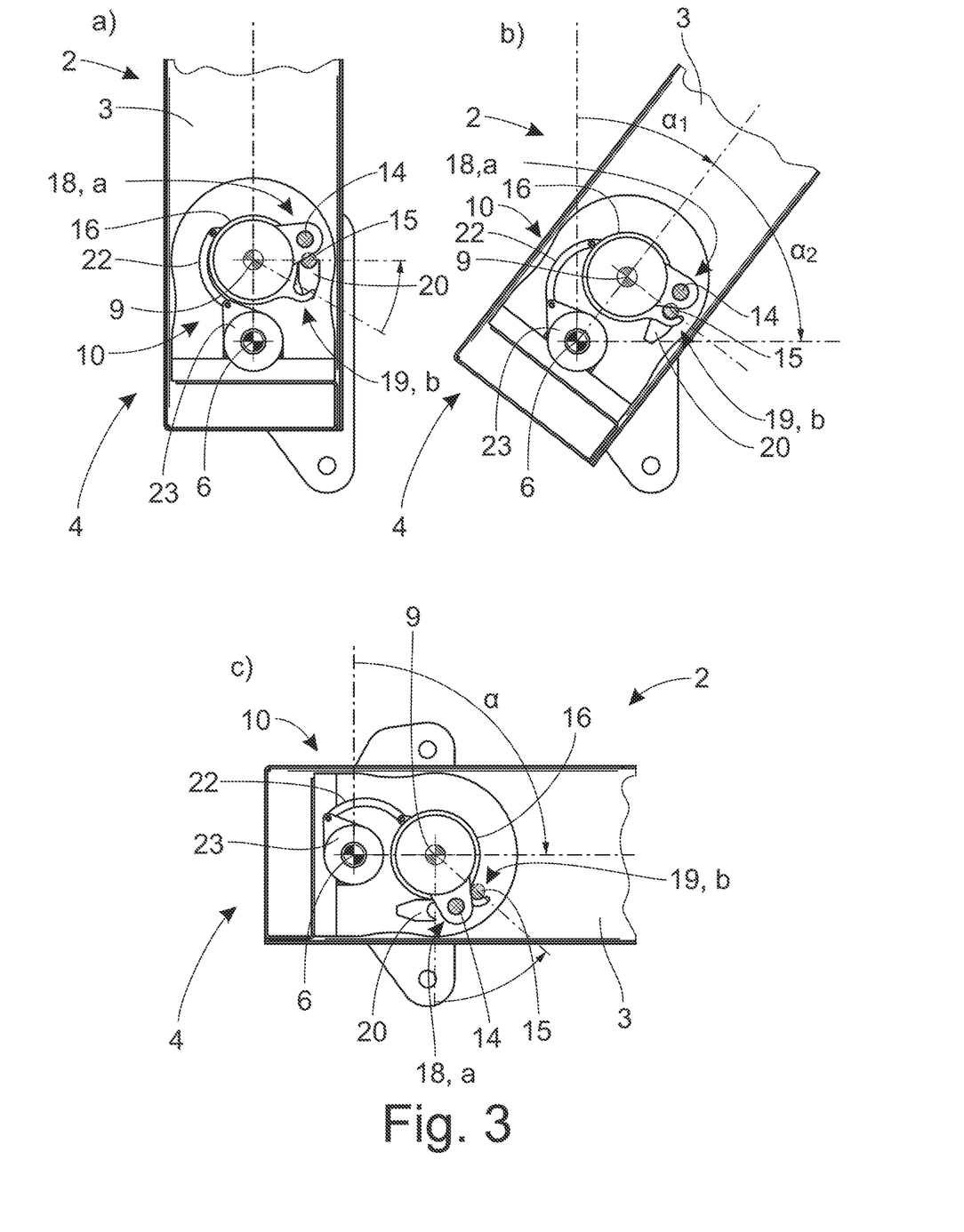
FIG. 3 shows the detail of FIG. 2 in a partially cut side view a) in the closed position of the flap, b) in an intermediate position of the flap and c) in the open position of the flap
Figure 4:
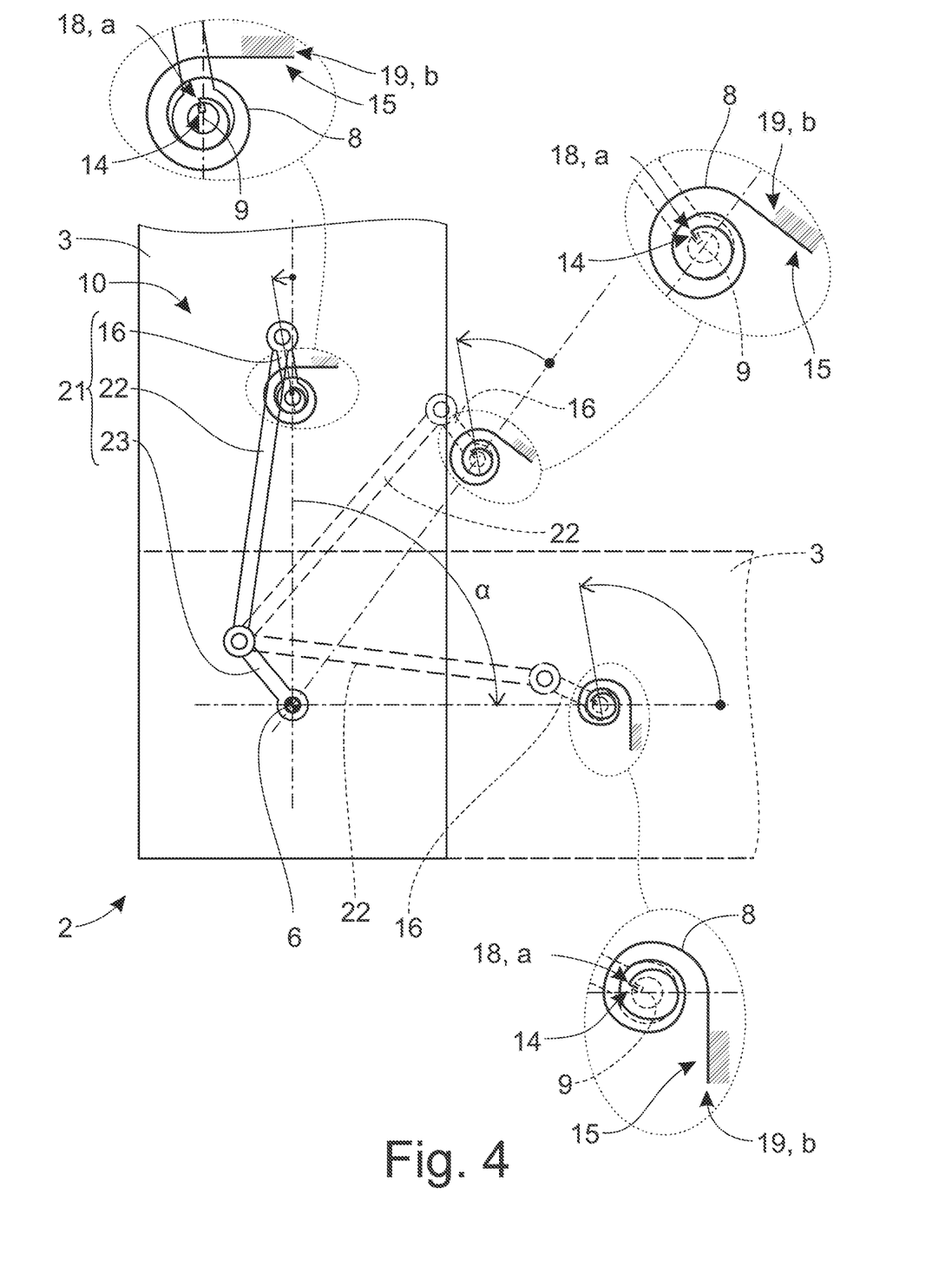
FIG. 4 shows a schematic view of an embodiment of the proposed flap arrangement in the closed position, the intermediate position and the open position of the flap.

As is shown in FIGS. 3 and 4, a supporting force or torque preferably acts on the flap 3 only over an angular section as of the pivot angle α of the flap 3. In another angular section $\alpha_1$ of the pivot angle α of the flap 3 or over the entire remaining pivot angle α of the flap 3 no supporting force or torque acts on the flap 3.

Moreover, FIGS. 3 and 4 show that in the exemplary embodiments in an angular section $\alpha_1$ of the pivot angle α of the flap 3 extending between the closed position and an intermediate position of at most 30 degrees, no supporting force or torque acts on the flap 3. Particularly, the angular section $\alpha_1$ in which no supporting force or torque acts on the flap 3, is at most 25 degrees, more particularly at most 20 degrees, more particularly at most 15 degrees. Preferably, a supporting force or torque is generated and/or acts on the flap 3 only in an angular section as of the pivot angle α of the flap 3 extending between the intermediate position and the open position.

However, in another embodiment not shown here, it is also conceivable that in an angular section $\alpha_1$ of the pivot angle α of the flap 3 extending between the open position and an intermediate position of at most 30 degrees, no supporting force or torque acts on the flap 3. Particularly, the angular section $\alpha_1$ in which no supporting force or torque acts on the flap 3, is at most 25 degrees, more particularly at most 20 degrees, more particularly at most 15 degrees. Preferably, a supporting force or torque is generated and/or acts on the flap 3 only in an angular section as of the pivot angle α of the flap 3 extending between the intermediate position and the closed position.

In the angular section $\alpha_1$ of the pivot angle α of the flap 3, in which no supporting force or torque acts on the flap 3, the torsion spring 8 may be free of load. If the flap 3 is pivoted within this angular section $\alpha_1$, it is conceivable according to that variant that no torsional torque is generated by the torsion spring 8, i.e. it is load-free, and therefore no supporting force or torque is generated. Preferably, a torsional torque is generated by the torsion spring 8 only when the flap 3 is pivoted beyond this angular section $\alpha_1$, whereby this then causes in particular the supporting force or torque.

Figure 2:
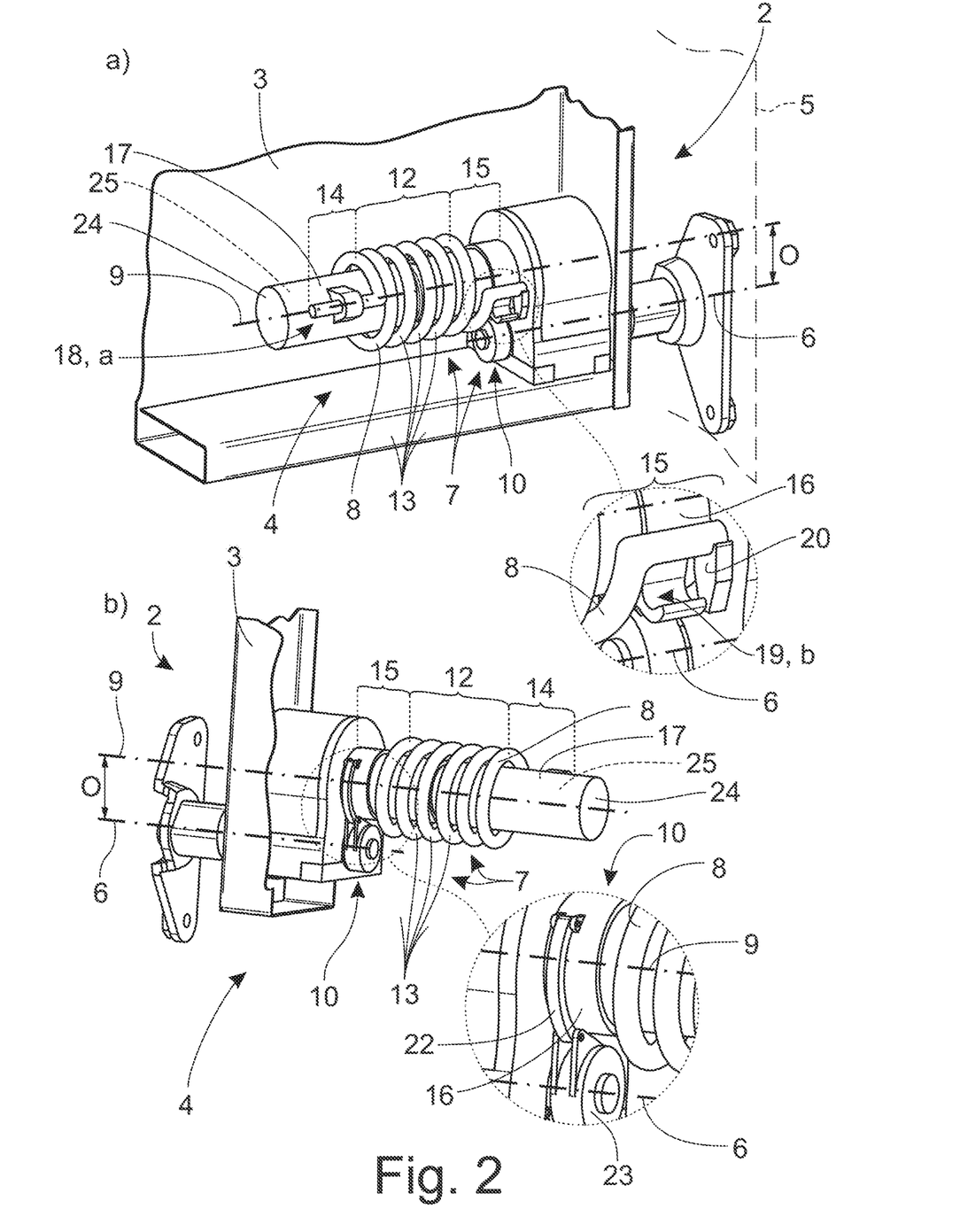
FIG. 2 shows a detail of the proposed flap arrangement a) in a first enlarged perspective view and b) in a second enlarged perspective view.

However, as shown in FIG. 2, it is preferred if in the angular section $\alpha_1$ of the pivot angle α of the flap 3, in which no supporting force or torque acts on the flap 3, the torsion spring 8 is biased about the torsion axis 9 between the flap-side torque transmission point a and a flap-side supporting element 20. In this state the torsion spring 8 is out of engagement with the body-side torque transmission point b.

The spring section 15 assigned to the body-side torque transmission point b, which may be a spring end section, does not engage with the body-side torque transmission point b until the flap 3 is pivoted beyond this angular section $\alpha_1$ of the pivot angle α. According to that variant, it is therefore conceivable that if the flap 3 is pivoted within the angular section $\alpha_1$, in which no supporting force or torque acts on the flap 3, a torsional torque is generated by the torsion spring 8, but this is not converted by the first gear unit 10 into a supporting force or torque and therefore no supporting force or torque is generated. Only when the flap 3 is pivoted beyond this angular section $\alpha_1$, the torsion spring 8 will generate a torsional torque which causes the supporting force or torque.

Moreover, according to the exemplary embodiments shown in FIGS. 2 to 4, in the opening direction of the flap 3 the supporting force or torque increases non-linearly over an angular section as of the pivot angle α of the flap 3 or, which is not shown here, over the entire pivot angle α of the flap 3. Thus, the torque of the flap 3 resulting from the weight force of the flap 3, which here increases with the increasing pivot angle α in the opening direction, is optimally compensated.

However, in another embodiment not shown here, it is also conceivable that in the closing direction of the flap 3 the supporting force or torque increases non-linearly over an angular section as of the pivot angle α of the flap 3 or over the entire pivot angle α of the flap 3. In this case, the torque of the flap 3 resulting from the weight force of the flap 3, which here increases with the increasing pivot angle α in the closing direction, is optimally compensated.

In particular, here in the opening direction of the flap 3 also the torsional torque generated by the torsion spring 8 increases non-linearly over an angular section as of the pivot angle α of the flap 3 or over the entire pivot angle α of the flap 3.

In another embodiment not shown here, it is also conceivable that in the closing direction of the flap 3 the torsional torque generated by the torsion spring 8 increases non-linearly over an angular section as of the pivot angle α of the flap 3 or over the entire pivot angle α of the flap 3.

The angular section with the non-linearly increasing supporting force or torque or torsional torque is in particular the total angular section as of the pivot angle α of the flap 3 in which a supporting force or torque acts on the flap 3. More particularly, here this is the angular section as of the pivot angle α which in the direction of opening of the flap 3 connects to the angular section al of the pivot angle α in which no supporting force or torque acts on the flap 3.

Furthermore, in the opening direction of the flap 3, the supporting force or torque may increase exponentially over an angular section as of the pivot angle α of the flap 3 or over the entire pivot angle α of the flap 3. The supporting force or torque may also increase in the opening direction over an angular section as of the pivot angle α of the flap 3 or over the entire pivot angle α of the flap 3 according to the first quadrant of the sinusoidal function.

However, in another embodiment not shown here, it is also conceivable that in the closing direction of the flap 3, the supporting force or torque may increase exponentially over an angular section as of the pivot angle α of the flap 3 or over the entire pivot angle α of the flap 3. The supporting force or torque may also increase in the closing direction over an angular section as of the pivot angle α of the flap 3 or over the entire pivot angle α of the flap 3 according to the first quadrant of the sinusoidal function.

In particular, in the opening direction of the flap 3, also the torsional torque may increase exponentially over an angular section as of the pivot angle α of the flap 3 or over the entire pivot angle α of the flap 3. The torsional torque may also increase in the opening direction over an angular section $\alpha_2$ of the pivot angle α of the flap 3 or over the entire pivot angle α of the flap 3 according to the first quadrant of the sinusoidal function.

However, in another embodiment not shown here, it is also conceivable that in the closing direction of the flap 3, also the torsional torque may increase exponentially over an angular section as of the pivot angle α of the flap 3 or over the entire pivot angle α of the flap 3. The torsional torque may also increase in the closing direction over an angular section as of the pivot angle α of the flap 3 or over the entire pivot angle α of the flap 3 according to the first quadrant of the sinusoidal function.

Moreover, here and preferably the first gear unit 10 is designed of the type of a four-bar linkage 21, a toothed gearbox or a chain or belt drive.

A four-bar linkage 21 is a mechanical linkage as shown in detail in FIG. 3 and schematically in FIG. 4. Here and preferably the lever 16 provides at one end the body-side torque transmission point b connected to the section 15 of the torsion spring 8. With this end, which is here in the form of a ring or sleeve, the lever 16 is pivot-mounted on the flap 3 such that the lever 16 can pivot about the torsion axis 9 which is fixed relative to the flap 3. Thereby the lever 16 can act on the torsion spring 8 such that the torsional torque increases or decreases. With its other end the lever 16 is pivotably connected to an end of a further lever 22 which is with its other end pivotably connected to an end of a fixed bar 23 which is immovably fixed to the body 5 of the vehicle 1. The flap pivot axis 6 of the flap 3, which is fixed relative to both the flap 3 and the body 5 of the vehicle 1, runs through the other end of the fixed bar 23. With this arrangement, in the opening direction of the flap 3 here the torsional torque increases exponentially over the angular section as of the pivot angle α of the flap 3.

Here and preferably the drive arrangement 4 comprises a drive unit 24 with a rotary motor unit 25 having an output shaft 26 rotating about an axis of rotation 27. The above mentioned housing 17 is a housing of the drive unit 24 and here accommodates the motor unit 25 as well as a possibly existing further drive component, e.g. a brake, a clutch or the like. The above mentioned housing 11 is a housing of the drive arrangement 4 and here accommodates the drive unit 24 and the torsion spring arrangement 7 and preferably also the first gear unit 10.

In the shown exemplary embodiments, the axis of rotation 27 is arranged with an offset O to the flap pivot axis 6. The drive arrangement 4 here also comprises a second gear unit 28 downstream of the motor unit 25 which converts a rotational movement of the output shaft 26 of the motor unit 25 into a pivotal movement of the flap 3 about the flap pivot axis 6 between the open position and the closed position. In particular, the second gear unit 28 is a reduction gearing.

Moreover, in the shown exemplary embodiments the axis of rotation 27 is arranged coaxially with the torsion axis 9, and/or, the torsion axis 9 and/or the axis of rotation 27 is arranged parallel or oblique or perpendicular to the flap pivot axis 6.

As can be seen in FIGS. 2 and 3, here the torsion spring 8 radially surrounds the motor unit 25. This is a particularly space-saving arrangement.

According to a second teaching, a flap arrangement 2 is claimed as such, the flap arrangement comprising a flap 3, in particular a tailgate, of a motor vehicle 1 and at least one proposed drive arrangement 4 for adjusting the flap 3. All explanations given with respect to the first teaching are fully applicable to this second teaching.

Here the torsion spring arrangement 7 and/or the outer unit is mounted on the flap 3, here in the flap 3.

It is pointed out that the above-discussed drive arrangement 4 may be arranged on each side of the flap 3. In such a case with two drive arrangements 4, one or both drive arrangements 4 may or may not comprise a drive unit 24 with a rotary motor unit 25 having an output shaft 26 rotating about an axis of rotation 27, wherein the axis of rotation 27 is arranged with an offset O to the flap pivot axis 6 and wherein the drive arrangement 4 has a second gear unit 28 downstream of the motor unit 25 which converts a rotational movement of the output shaft 26 of the motor unit 25 into a pivotal movement of the flap 3 about the flap pivot axis 6 between the open position and the closed position. In the present exemplary embodiment shown in FIG. 1, only one single drive arrangement 4 is shown which is the only drive arrangement 4 of the flap arrangement 2.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive arrangement for adjusting a flap of a motor vehicle mounted on a motor vehicle body in a mounted state so that the flap is pivotable, about a flap pivot axis and along a pivot angle, between an open position and a closed position, the drive arrangement comprising:
   a torsion spring arrangement having a torsion spring configured to generate a torsional torque about a torsion axis offset from the flap pivot axis; and
   a first gear unit configured to convert the torsional torque into a supporting force or torque acting on the flap to move the flap towards the closed position or towards the open position.

2. The drive arrangement of claim 1, wherein the torsion spring is a helical torsion spring or a torsion bar.

3. The drive arrangement of claim 1, wherein the torsion axis is disposed between a flap-side torque transmission point and a body-side torque transmission point.

4. The drive arrangement of claim 3, wherein the flap-side torque transmission point is formed by a flap-side stop and/or the body-side torque transmission point is formed by a body-side stop wherein the spring includes a first spring section and a second spring section, wherein the first spring section engages the flap-side stop and the second spring section engages the body-side stop.

5. The drive arrangement of claim 4, wherein the supporting force or torque is greater when the flap is in the open position than when the flap is in the closed position, or the supporting force or torque is greater when the flap in the closed position than when the flap is in the open position.

6. The drive arrangement of claim 1, wherein the supporting force or torque acts on the flap only when the flap is disposed within a portion of the pivot angle.

7. The drive arrangement of claim 3, wherein when the flap is disposed within a first angular section of the pivot angle between the closed position and a first intermediate position, less than or equal to 30 degrees from the closed position, no supporting force or torque acts on the flap, or when the flap is disposed within a second angular section of the pivot angle between the open position and a second intermediate position, less than or equal to 30 degrees from the open position, no supporting force or torque acts on the flap.

8. The drive arrangement of claim 7, further comprising a flap-side supporting element extending from the body-side torque transmission point, wherein when the flap is disposed within either the first angular section or the second angular section, the torsion spring is disengaged from the body-side torque transmission point.

9. The drive arrangement of claim 1, further comprising:
a drive unit including
- a rotary motor unit provided with an output shaft configured to rotate about an axis of rotation, wherein the axis of rotation is offset from the flap pivot axis, and
- a second gear unit configured to convert rotational movement of the output shaft to pivot the flap about the flap pivot axis.

10. The drive arrangement of claim 9, wherein the axis of rotation is coaxial to the torsion axis.

11. The drive arrangement of claim 10, wherein the torsion spring radially surrounds the motor unit.

12. The drive arrangement of claim 1, wherein as the flap moves between the open position and the closed position, the supporting force or torque increases according to a first quadrant of a sinusoidal function over at least a portion of the pivot angle.

13. A drive for adjusting a flap coupled to a vehicle body of a motor vehicle and pivotable about a flap-pivot axis and configured to pivot along a pivot angle between an open position and a closed position, the drive comprising:
- a fixed bar configured to be coupled to the vehicle body and defining the flap-pivot axis;
- a motor including a housing and an output shaft configured to rotate in a first rotational direction and a second rotational direction;
- a gear unit coupled to the output shaft and configured to pivot the flap between the open position and the closed position as the motor rotates in either the first rotational direction or the second rotational direction; and
- a torsion spring including a first end fixed to the housing and a second end configured to engage a flap-side supporting element as the flap pivots along at least a portion of the pivot angle such that the torsion spring biases the flap towards the closed position.

14. The drive of claim 13, wherein the torsion spring is a helical spring arranged coaxially to the motor housing.

15. The drive of claim 14, wherein the torsion spring defines a torsion axis and wherein the torsion axis and the flap-pivot axis are offset from one another.

16. A drive for adjusting a flap coupled to a vehicle body of a motor vehicle and pivotable about a flap-pivot axis and configured to pivot along a pivot angle between an open position and a closed position, the drive comprising:
- a drive housing;
- a fixed bar configured to be coupled to the vehicle body and defining the flap-pivot axis;
- a first lever configured to be coupled to the vehicle body;
- a second lever pivotally coupled to the fixed bar and to the first lever, wherein as the flap moves from the closed position to the open position, the first lever and the second lever each move with the flap from a first position, associated with the closed position, to a second position, associated with the open position; and
- a spring including a first end and a second end, wherein the first end is fixed to the drive housing and the second end is configured to engage the first lever when the flap is in the open position.

17. The drive of claim 16, further comprising:
- a motor including a motor housing and an output shaft at least partially disposed in the motor housing and configured to rotate in a first rotational direction and a second rotational direction; and
- a gear unit coupled to the output shaft and configured to pivot the flap between the open position and the closed position as the motor rotates in either the first rotational direction or the second rotational direction.

18. The drive of claim 17, wherein the second lever includes a ring concentrically arranged with the motor housing.

19. The drive of claim 18, wherein the ring includes a hook configured to receive the second end of the spring.

* * * * *